US009461352B2

(12) United States Patent
Jung-Kubiak et al.

(10) Patent No.: US 9,461,352 B2
(45) Date of Patent: Oct. 4, 2016

(54) MULTI-STEP DEEP REACTIVE ION ETCHING FABRICATION PROCESS FOR SILICON-BASED TERAHERTZ COMPONENTS

(71) Applicant: California Institute of Technology, Pasadena, CA (US)

(72) Inventors: Cecile Jung-Kubiak, Pasadena, CA (US); Theodore Reck, Pasadena, CA (US); Goutam Chattopadhyay, Pasadena, CA (US); Jose Vicente Siles Perez, Pasadena, CA (US); Robert H. Lin, Chino, CA (US); Imran Mehdi, South Pasadena, CA (US); Choonsup Lee, La Palma, CA (US); Ken B. Cooper, Glendale, CA (US); Alejandro Peralta, Huntington Beach, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 14/253,541

(22) Filed: Apr. 15, 2014

(65) Prior Publication Data

US 2014/0340178 A1 Nov. 20, 2014

Related U.S. Application Data

(60) Provisional application No. 61/812,097, filed on Apr. 15, 2013.

(51) Int. Cl.

| | |
|---|---|
| ***G02B 6/136*** | (2006.01) |
| ***H01P 3/16*** | (2006.01) |
| ***H01P 11/00*** | (2006.01) |

(52) U.S. Cl.

CPC ............... *H01P 3/16* (2013.01); *H01P 11/002* (2013.01); *H01P 11/006* (2013.01)

(58) Field of Classification Search

None

See application file for complete search history.

(56) References Cited

U.S. PATENT DOCUMENTS

| | | | | |
|---|---|---|---|---|
| 2008/0247712 A1* | 10/2008 | Hogen | ................. | G02B 6/4201 385/92 |
| 2009/0252938 A1* | 10/2009 | Baik | ..................... | C23C 14/022 428/209 |
| 2009/0256251 A1* | 10/2009 | Getz | ....................... | B81B 7/007 257/698 |
| 2015/0125111 A1* | 5/2015 | Orcutt | .................... | G02B 6/122 385/14 |

OTHER PUBLICATIONS

Leal-Sevillano, C.A., et al., "Silicon Micromachined Canonical E-Plane and H-Plane Bandpass Filters at the Terahertz Band", IEEE Microwave and Wireless Components Letters, Jun. 2013, pp. 288-290, vol. 23, No. 6.

(Continued)

*Primary Examiner* — Shamim Ahmed

(74) *Attorney, Agent, or Firm* — Gates & Cooper LLP

(57) ABSTRACT

A multi-step silicon etching process has been developed to fabricate silicon-based terahertz (THz) waveguide components. This technique provides precise dimensional control across multiple etch depths with batch processing capabilities. Nonlinear and passive components such as mixers and multipliers waveguides, hybrids, OMTs and twists have been fabricated and integrated into a small silicon package. This fabrication technique enables a wafer-stacking architecture to provide ultra-compact multi-pixel receiver front-ends in the THz range.

18 Claims, 6 Drawing Sheets

(56) References Cited

OTHER PUBLICATIONS

Reck, T.J., et al., "Measurement of Silicon Micromachined Waveguide Components at 500-750 GHz", IEEE Transactions on Terahertz Science and Technology, Jan. 2014, pp. 33-38, vol. 4, No. 1.

Chattopadhyay, G., et al., "Submillimeter-Wave 90° Polarization Twists for Integrated Waveguide Circuits", IEEE Microwave and Wireless Components Letters, Nov. 2010, pp. 592-594, vol. 20, No. 11.

Chattopadhyay, G., et al., "Deep Reactive Ion Etching Based Silicon Micromachined Components at Terahertz Frequencies for Space Applications", Infrared, Millimeter and Terahertz Waves, IRMMW-THz, 2008, pp. 1-2.

Smith, C.H., et al., "Development of a Multi-layer SU-8 Process for Terahertz Frequency Waveguide Blocks", Microwave Symposium Digest, IEEE MTT-S International, Jun. 2005, pp. 439-442.

Stanec, J.R., et al., "Fabrication and Integration of Micromachined Submillimeter-Wave Circuits", IEEE Microwave and Wireless Components Letters, Aug. 2011, pp. 409-411, vol. 21, No. 8.

Lubecke, V.M., et al., "Micromachining for Terahertz Applications", IEEE Transactions on Microwave Theory and Techniques, Nov. 1998, pp. 1821-1831, vol. 46, No. 11.

Jung, C., et al., "Compact Submillimeter-wave Receivers made with Semiconductor Nano-Fabrication Technologies", IEEE MTT International Microwave Symposium, Baltimore, Md., USA, Jun. 2011, pp. 1-4.

Dunning, A., et al., "A Simple Orthomode Transducer for Centimeter to Submillimeter Wavelengths", International Symposium on Space Terahertz Technology, ISSTT 2009, pp. 1-4.

Boussaha, F., et al., "Terahertz-frequency Waveguide HEB Mixers for Spectral Line Astronomy," Proceedings of SPIE Conference on Telescopes and Astronomical Instrumentation, Amsterdam-Netherlands, Jul. 2012, pp. 1-7, vol. 8452.

* cited by examiner

FIG. 1B
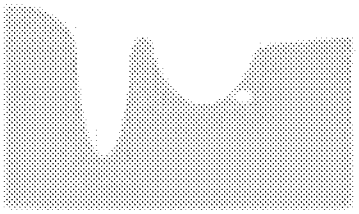
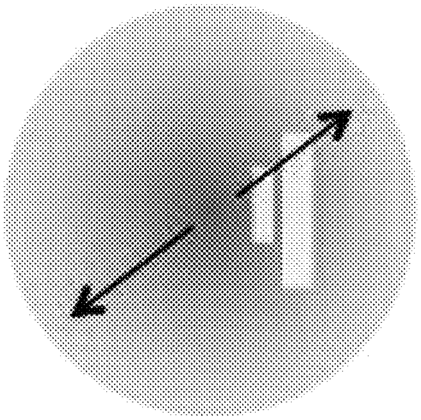
FIG. 1A
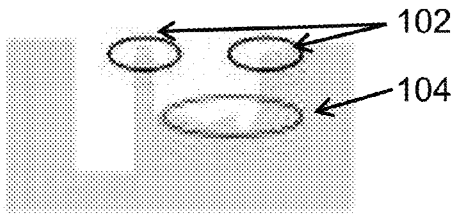
FIG. 1C
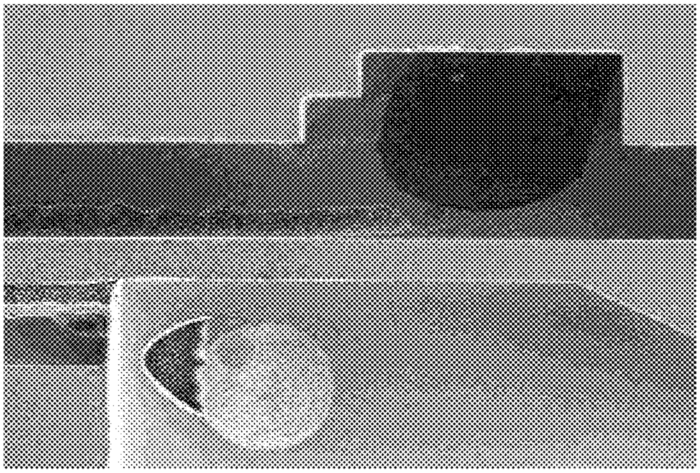
FIG. 2

FIG. 11
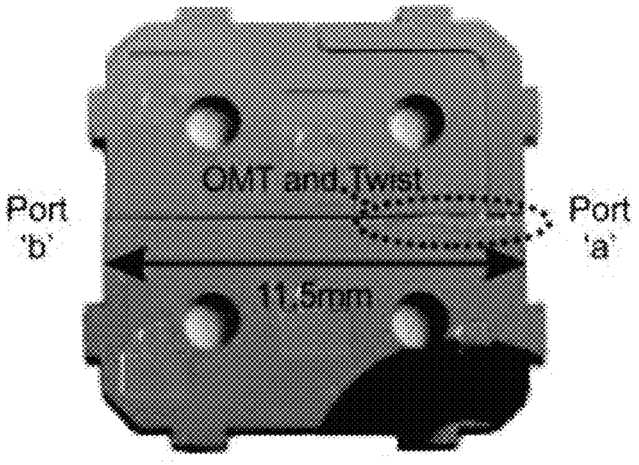
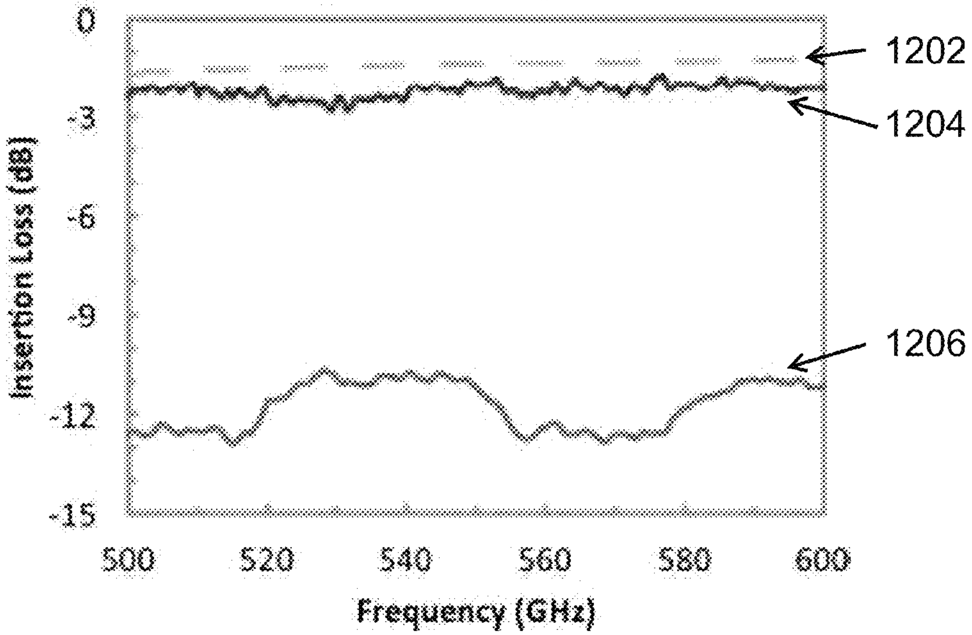
FIG. 12

MULTI-STEP DEEP REACTIVE ION ETCHING FABRICATION PROCESS FOR SILICON-BASED TERAHERTZ COMPONENTS

CROSS-REFERENCE TO RELATED APPLICATIONS

This application claims priority to and the benefit of U.S. provisional patent application Ser. No. 61/812,097, filed Apr. 15, 2013, which application is incorporated herein by reference in its entirety.

STATEMENT REGARDING FEDERALLY FUNDED RESEARCH OR DEVELOPMENT

The invention described herein was made in the performance of work under a NASA contract, and is subject to the provisions of Public Law 96-517 (35 USC 202) in which the Contractor has elected to retain title.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

FIELD OF THE INVENTION

The invention relates to silicon wafer fabrication methods in general and particularly to fabrication methods that employ deep reactive ion etching (DRIE).

BACKGROUND OF THE INVENTION

THz instruments are being proposed as highly sensitive instruments for the remote sensing of planetary atmospheres on Mars, Venus, Jupiter, Saturn and Saturn's moon Titan. For these long-term planetary missions, severe constraints are put on the mass and power budget for the payload instruments. See for example V. M. Lubecke, K. Mizuno, G. M. Rebeiz, "*Micromachining for terahertz applications*", IEEE-MTT, pp. 1821-1831, 1998. Conventional approaches which package the receiver components in CNC machined metal waveguide blocks are too massive and expensive for multi-pixel instruments that fit within these tight budgets.

Several different micromachining techniques exist for fabrication of terahertz circuits. One process forms the waveguide and device structures directly from permanent resists such as SU-8, as is described in J. Stanec and N. Barker, "Fabrication and integration of micromachined submillimeter-wave circuits," *Microwave and Wireless Components Letters, IEEE*, vol. 21, no. 8, pp. 409-411, August 2011. This technique, while requiring a minimum of processing tools, suffers from significant process instabilities and delamination issues between the thick resist and carrier wafer.

LIGA-based processes use thick resists to form a mold for electroplating, as described in C. H. Smith, H. Xu, and N. Barker, "Development of a multilayer SU-8 process for terahertz frequency waveguide blocks," *Microwave Symposium Digest,* 2005 *IEEE MTT-S International*, pp. 439-442, June 2005. This has the advantage of producing a metal structure and is therefore easier to couple to standard metal waveguide components. However, both of these processes suffer from non-uniformity issues that require an additional processing step, such as lapping, to planarize the final device.

There is a need for ultra-compact receiver architectures to reduce the mass and size of the receiver while increasing the circuit density of the device.

There is a need for fabrication methods that will permit the accurate fabrication of such devices in silicon.

SUMMARY OF THE INVENTION

According to one aspect, the invention features a method of manufacturing a terahertz waveguide circuit element. The method comprises the steps of providing a silicon wafer having a surface; providing a $SiO_2$ layer having an initial thickness on the surface; etching a plurality N of $SiO_2$ patterns in the $SiO_2$ layer, each of the plurality N of $SiO_2$ patterns having a respective thickness representing a respective depth of etching into the silicon wafer, the respective thicknesses being different from one another, where N is an integer greater than one; and repeating a total of N times in succession the two steps of performing an $SiO_2$ etch simultaneously on all of the plurality N of $SiO_2$ patterns to expose a respective region of the surface of the silicon wafer beneath the thinnest remaining one of the plurality N of $SiO_2$ patterns; and performing a silicon etch simultaneously on the silicon wafer below all of the exposed respective regions of the surface of the silicon wafer.

In one embodiment, the step of providing a $SiO_2$ layer on the surface is performed by plasma-enhanced chemical vapor deposition.

In another embodiment, the step of providing a $SiO_2$ layer on the surface is performed by thermal growth of $SiO_2$.

In yet another embodiment, the initial thickness of the $SiO_2$ layer is sufficient to provide a safety margin after the plurality of patterns are etched in the $SiO_2$ layer.

In still another embodiment, the step of performing a $SiO_2$ etch is done using an inductively coupled plasma.

In a further embodiment, the step of performing a silicon etch is done using deep reactive ion etching.

In yet a further embodiment, the deep reactive ion etching is performed using $SF_6$.

In an additional embodiment, the deep reactive ion etching is followed by a step comprising exposing the silicon wafer to $C_4F_8$ gas.

In one more embodiment, a final etch depth is controlled to within 2% of a depth target.

According to another aspect, the invention relates to a terahertz waveguide circuit element manufactured according to the methods previously enumerated.

In one embodiment, the terahertz waveguide circuit element has a cross section of the waveguide that is rectangular.

In another embodiment, the terahertz waveguide circuit element has a final etch depth that is controlled to within 2% of a depth target.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIG. 1A is a plan view that illustrates resist spinning on a wafer.

FIG. 1B is a cross section view of a wafer that illustrates the resist coverage prior to DRIE using conventional methods.

FIG. 1C is a cross section view of a wafer that illustrates the results after DRIE using the resists of FIG. 1B. Due to thin resist coverage at the edges, the pattern is overetched (indicated by 102) and holes are etched at the bottom of a waveguide due to bad resist protection inside an already etched channel (indicated by 104).

FIG. 2 is an image that shows holes etched at the bottom of the patterns illustrated in FIG. 3.

FIG. 11 is an image of a silicon micromachined waveguide test feature highlighting the waveguide OMT and twist.

FIG. 12 is a graph showing the results of insertion loss measurements vs. frequency for a simulation (curve 1202) a wafer fabricated using the multi-step DRIE process (curve 1204) and a wafer fabricated using the first process with a $SiO_2$ hard mask (curve 1206). The insertion loss shown is between ports 'a' and 'b' shown in FIG. 11, so the signal passes through both the OMT and twist.

DETAILED DESCRIPTION

Fabrication Methods

Figure 3:
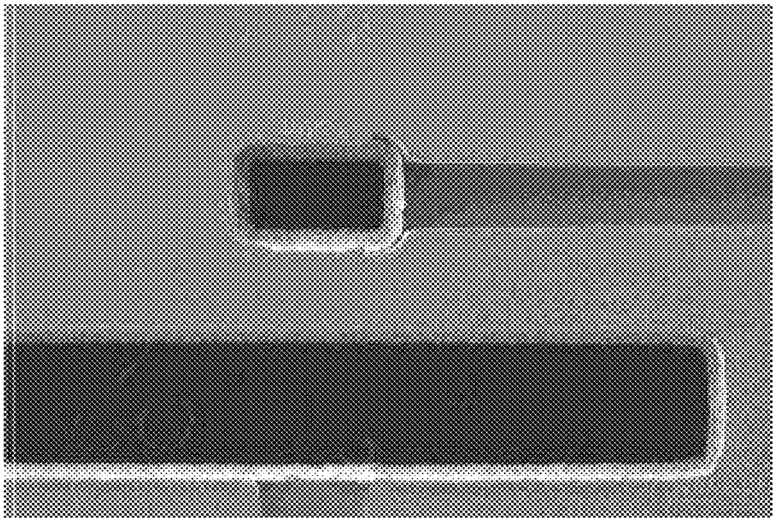
FIG. 3 is an image that shows over-etched patterns.

One approach for fabricating highly integrated and compact submillimeter receiver front-ends is to make all the RF elements in silicon where the power amplifiers, multipliers, and mixer chips can be integrated in a single silicon micromachined block.

We describe semiconductor-based fabrication techniques that allow the integration of passive and active components into such a stacked silicon wafer configuration. This architecture shrinks the heterodyne receiver front-end elements by an order of magnitude in mass and size compared to conventional metal milling techniques.

The utilization of micromachined silicon blocks for THz circuits places a number of important considerations on these structures. Very smooth etched surfaces are advantageous to minimize ohmic losses in THz frequency waveguides and device channels. The cross section of the waveguide preferably should be precisely rectangular in order to minimize scattering from geometric inhomogeneities and to allow the successful integration of MMIC amplifiers, multipliers, and mixers.

Initial Fabrication Techniques

We employ silicon Deep Reactive Ion Etching (DRIE), a technique that we believe offers a wider range of possibilities in terms of structures, designs and better resolutions that other methods. DRIE of bulk silicon wafers is a relatively well-established fabrication technique capable of etching high aspect ratio features. See for example G. Chattopadhyay, J. Ward, H. Manohara, and R. Toda, "*Deep reactive ion etching based silicon micromachined components at terahertz frequencies for space applications*", in Infrared, Millimeter and Terahertz Waves, IRMMW-THz 2008, pp. 1-2. It uses the Bosch process based on the alternative exposures to $SF_6$ and $C_4F_8$ gases, in which the $SF_6$ is used to etch the silicon, while the $C_4F_8$ passivates the etched surfaces. See for example F. Laermer and A. Schilp, Method of Anisotropic Etching Si, U.S. Pat. No. 5,501,893, issued Mar. 26, 1996. Since the method is based on etching, this technique struggles to maintain straight sidewalls, uniform depths across the wafer for each etch depth and smooth etched patterns. All of these are important parameters for the integration of THz waveguide components. Intensive work has been performed to optimize the etching process parameters, previously presented in C. Jung, B Thomas, C. Lee, A. Peralta, G. Chattopadhyay, J. Gill, R. Lin, E. Schlecht, K. Cooper and I. Mehdi, "*Compact Submillimeterwave Receivers made with Semiconductor Nano-Fabrication Technologies*", IEEE MTT International Microwave Symposium, Baltimore, Md., USA, June 2011.

We initially used AZ9260 and AZ5214 photoresists (PR) and UV photolithography defined patterns to test the various etch process parameters. However, the use of these "soft" masks proved to be limited when several etch depths were required within the same wafer. An additional problem is the etch selectivity between the photoresist and the silicon which was not always sufficient for etching through the entire thickness of the wafer.

Therefore, a different kind of patterning mask is needed, with better selectivity, which allows one to fabricate numerous etch patterns with different depths, all within the same silicon piece.

When etching using conventional wafer processing, UV photoresists are commonly used as patterning masks. They are deposited on a wafer using a spinning technique, providing a perfectly uniform surface on a flat, non-processed wafer. Each pattern is individually etched to its depth target and the mask is removed with solvents. This process is then repeated until all the patterns are fabricated.

However, after two or more deep etches are performed, the wafer is in general not sufficiently flat to achieve uniform photoresist coverage. The resist becomes very thin at the edge of an etched channel, getting even thinner for patterns on the outer side of the wafer as the amount of resist available decreases, and the mask will not be homogeneous at the bottom of the channel, as shown in FIG. 1B. If the resist is too thin at the edge or does not cover the bottom surface of a previously etched pattern, undesired areas will be exposed and etched. FIG. 1C illustrates these problems with a diagram.

FIG. 2 is an image that shows holes etched at the bottom of the patterns illustrated in FIG. 3.

FIG. 3 is an image that shows over-etched patterns.

Addition of $SiO_2$ as a Hard Mask

To solve the problem of the thin photoresist at the edge of the etched patterns, we deposit silicon dioxide ($SiO_2$) as an additional mask, protecting the silicon where the resist is too thin. The average selectivity of the DRIE process between photoresist and silicon is 50:1 but with $SiO_2$ we can achieve a 150:1 selectivity, making it an excellent hard mask candidate. $SiO_2$ is either deposited with plasma-enhanced chemical vapor deposition (PECVD) or thermally grown before processing the wafer. It is then patterned using a thin resist, followed by etching with a fluorine-based inductively coupled plasma (ICP) to expose the silicon.

Figure 4:
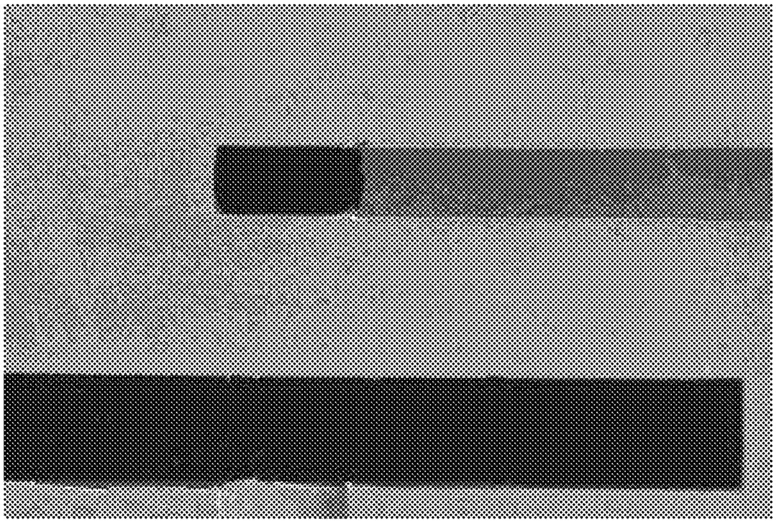
FIG. 4 is an image of the same double-depth pattern as in FIG. 3 with the addition of a mask of $SiO_2$. The $SiO_2$ clearly provides patterns that are better defined in shape and size.
Figure 5:
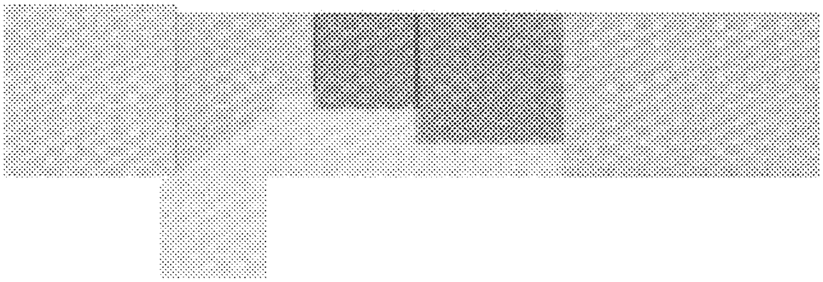
FIG. 5 is an illustration showing a mask layout of an OMT design.

This additional hard mask proves to be very precise for controlling the size and shape of a pattern, avoiding the overetching previously observed. The results are presented in FIG. 4. FIG. 4 is an image of the same double-depth pattern as in FIG. 3 with the addition of a mask of $SiO_2$. The $SiO_2$ clearly provides patterns that are better defined in shape and size.

Figure 6:
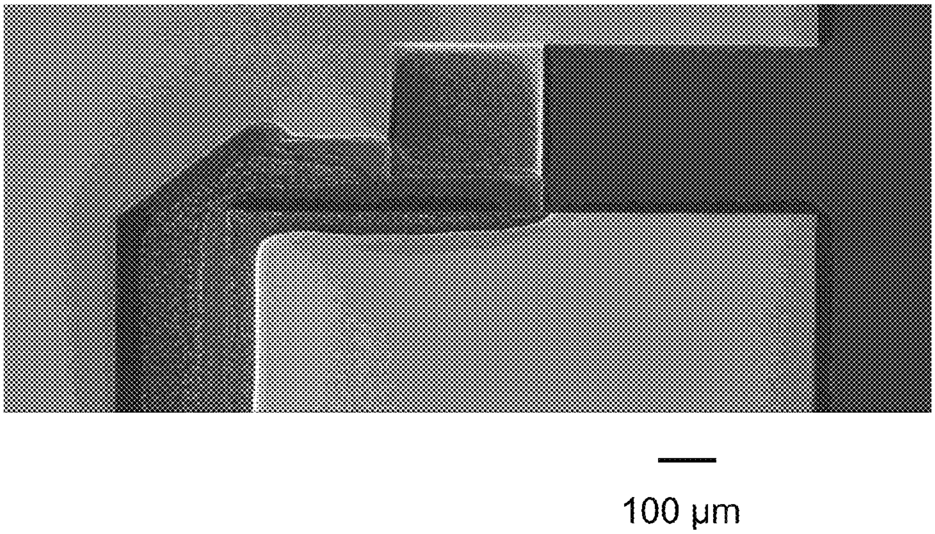
FIG. 6 is an image showing extreme over-etching around the edges of the patterns of the design of FIG. 5 after only 3 etch patterns were processed.

However, $SiO_2$ helps as a protective mask only for a small number of etch depths. When working with 3 or more etch depths, the resist coverage degenerates to the point where the $SiO_2$ cannot compensate for the poor resist edge coverage. Using thicker layers of $SiO_2$ creates additional problems such as overheating of the photoresist during the ICP etch and excessive residual stress causing delamination of PECVD deposited $SiO_2$ films. As an illustration, FIG. 6 presents the SEM picture of a 6-depth OMT design (see for example A. Dunning, S. Srikanth and A. R. Kerr, "A Simple Orthomode Transducer for Centimeter to Submillimeter Wavelengths", International Symposium on Space Terahertz Technology, ISSTT 2009), with extreme over-etching problems despite a thick $SiO_2$ protective mask of 4 μm.

Moreover, as the $SiO_2$ is only present on the top surface of the wafer, it does not solve the resist coverage issue at the bottom of an etched pattern. Therefore, the process in which each pattern was individually etched to its desired depth would not work for the fabrication of complicated THz circuits.

Multi-Step DRIE Process

In the new fabrication process, we avoid the use of photoresist in DRIE. This solves the through-wafer etch issue. We use only $SiO_2$ as the hard mask. Instead of etching each pattern individually to its desired depth, we etch only the depth difference between each pattern, as presented in Table 1. For example, rather than etching, 200 μm then 150 μm, 105 μm and so on, we will only etch 50 μm, then 45 μm, then 40 μm, and so forth. Every pattern is gradually etched down with the next one until all the patterns are completed to their final depth target.

TABLE 1

Example for 5-etch pattern, where each depth difference is highlighted by underlining.

| | 200 | 150 | 105 | 65 | 10 | $SiO_2$ Thickness |
|---|---|---|---|---|---|---|
| 200 | 50 | 95 | 135 | 190 | 200 | 340 nm |
| 150 | | 45 | 85 | 140 | 150 | 300 nm |
| 105 | | | 40 | 95 | 105 | 270 nm |
| 60 | | | | 55 | 65 | 370 nm |
| 20 | | | | | 10 | 70 nm |

Prior any DRIE etching, each etch depth pattern is masked by UV photolithography. Using the DRIE recipe $SiO_2$:Si selectivity and the depth difference between each step, the thickness of $SiO_2$ needed for each pattern can be calculated, as presented in Table 1. As a protection margin of safety, an addition 10-20 nm is added to these numbers in case the selectivity in DRIE fluctuates. The $SiO_2$ is etched in ICP, with a ~70 nm/min etch rate to ensure precise control over the final thickness. Once all the $SiO_2$ steps are defined, the first pattern in etched down to the silicon and the DRIE etching can begin. It should be noted that by defining the patterns in $SiO_2$ before any DRIE is performed, a thin photoresist can be used which offers the best resolution available.

Figure 7:
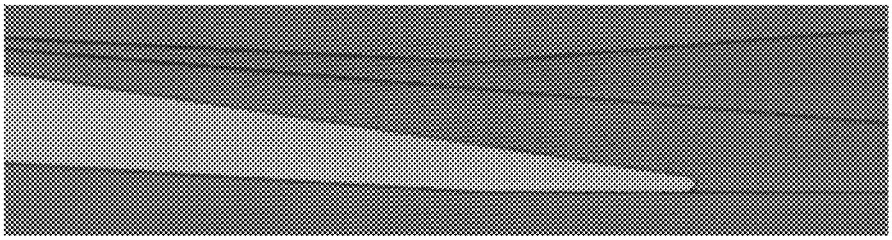
FIG. 7 is a diagram that illustrates a predefined $SiO_2$ pattern of a waveguide twist.

FIG. 7 is a diagram that illustrates a predefined $SiO_2$ pattern of a waveguide twist.

Figure 8:
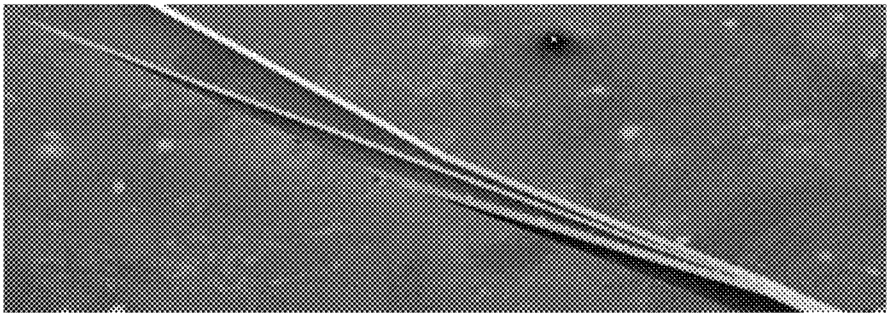
FIG. 8 is an SEM image of a waveguide twist after completion of all the etch steps using the multi-step DRIE process.

FIG. 8 is an SEM image of a waveguide twist after completion of all the etch steps using the multi-step DRIE process.

Figure 9:
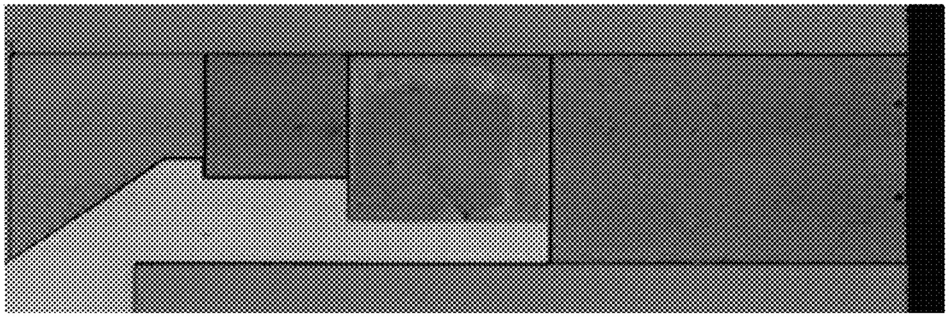
FIG. 9 is a diagram that illustrates a predefined $SiO_2$ pattern of an OMT.

FIG. 9 is a diagram that illustrates a predefined $SiO_2$ pattern of an OMT. Each segment represents a DRIE etch depth, defined by a specific $SiO_2$ thickness.

Figure 10:
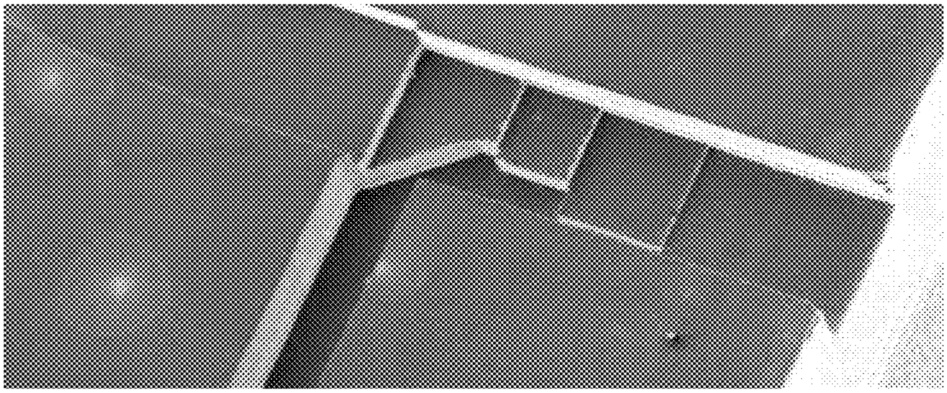
FIG. 10 is an SEM image of an OMT after completion of all the etch steps using the multi-step DRIE process.

FIG. 10 is an SEM image of an OMT after completion of all the etch steps using the multi-step DRIE process.

See for example G. Chattopadhyay, J. Ward, N. Llombert and K. Cooper, *"Submillimeter-Wave 90° Polarization Twists for Integrated Waveguide Circuits"*, IEEE Microwave and Wireless Components Letters, 2010, 20, 592-594.

Starting from the deepest etch depth, we can now start the DRIE etching, using the predefined $SiO_2$ as the patterning mask and the depth difference between each step as the pattern depth. Between each etch depth, the $SiO_2$ must be etched in the ICP to remove the remaining few nm of $SiO_2$ (from the extra-protection) to expose the silicon for the next pattern. The final step in DRIE will be the shallowest etch depth of the design and will complete all the patterns to their final depth target.

As a comparison, FIG. 6 and FIG. 10 present the same OMT design, fabricated using the old and new processes, respectively. We can see that the multi-step process offers far better results in terms of pattern definition and shape control. In addition, using our multi-step DRIE process provides excellent control over the final depth for each step, achieving tolerances greater than 2% over the final depth target.

Testing Results

While working on the process optimization, various tests features were fabricated to validate each development step. Straight waveguide sections measured show losses comparable to metal machined waveguides. At WR-1.5 (500 to 750 GHz) losses were measured at 0.1-0.08 dB/mm. See T. Reck, C. Jung-Kubiak, J. Gill, and G. Chattopadhyay, *"Measurement of silicon micromachined waveguide components at 500 to 750 GHz"*, IEEE Transactions on Terahertz Science and Technology, 2014, vol. 4, issue 1, pp. 33-38.

We also recently reported our work on waveguide filters at frequencies covering the entire WR-1.5 band fabricated using this technique. See C. A. Leal-Sevillano, T. Reck, C. Jung-Kubiak, G. Chattopadhyay, J. A. Ruiz-Cruz, J. R. Montejo-Garai, and J. M. Rebollar, "*Silicon Micromachined Canonical E-Plane and H-Plane Bandpass Filters at the Terahertz Band*", IEEE Microwave and Wireless Components Letters, 2013, vol. 23, issue 6, pp. 288-290.

These structures only tested single etch depth devices, so to characterize the electromagnetic performance of the multietch step process a significantly more complex device is chosen, the series connection of the waveguide polarization twist shown in FIG. 8 and the orthomode transducer (OMT) shown in FIG. 10. FIG. 11 shows the OMT and twist test device.

FIG. 12 shows measurements results comparing the initial hard mask process to the final multi-step etch process. The insertion loss, or the power lost through the device, is appreciably improved with the use of the multi-etch step process. This improvement is believed to come from a reduction in waveguide loss by the elimination of the over-etching produced by poor resist coverage. In addition, the waveguide circuit couples more efficiently since the multi-step etch process provides improved pattering accuracy.

This multi-step DRIE process has also been demonstrated in high frequency circuits where the use conventional machining techniques is not possible, due to the very fine structures needed. We recently demonstrated a 2.55 THz waveguide HEB mixer block, with a DSB receiver noise temperature of $T_{rec}^{DSB}$ of 2000±100 K (Y-factor of 1.09±0.005). See Faouzi Boussaha, Jonathan Kawamura, Jeffery Stern, Cecile Jung, Anders Skalare, and Victor White, "Terahertz-frequency Waveguide HEB Mixers for Spectral Line Astronomy," Proceedings of SPIE Conference on Telescopes and Astronomical Instrumentation, Amsterdam-Netherlands, July 2012.

We have described a fabrication process for silicon-based terahertz (THz waveguide components. This technique uses a predefined $SiO_2$ hard mask and a DRIE etching process, in which the difference between each pattern is etched, to gradually form a complex multi-depth structure. This technique provides precise dimensional control across multiple etch depths with batch processing capabilities. Nonlinear and passive components such as mixers and multipliers waveguides, hybrids, OMTs and twists have been fabricated and integrated into a small silicon package. This fabrication technique enables a wafer-stacking architecture to provide ultra-compact multi-pixel receiver front-ends in the THz range. The fabricated silicon parts are extremely well defined and the final etch depths are controlled to within 2% of a depth target. Tests validate the use of silicon for THz circuits as a batch-process alternative to conventional metal machining, enabling large pixel count ultra-compact receiver architectures.

DEFINITIONS

Unless otherwise explicitly recited herein, any reference to an electronic signal or an electromagnetic signal (or their equivalents) is to be understood as referring to a non-transitory electronic signal or a non-transitory electromagnetic signal.

Any patent, patent application, patent application publication, journal article, book, published paper, or other publicly available material identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. A method of manufacturing a silicon waveguide circuit element, comprising the steps of:

providing a silicon wafer having a surface comprising a flat surface;

providing a $SiO_2$ layer having an initial thickness on said surface;

etching a plurality N of patterns in said $SiO_2$ layer, to form a plurality N of $SiO_2$ patterns having a respective thickness representing a respective depth of etching into said silicon wafer, said respective thicknesses being different from one another, where N is an integer greater than one; and repeating a total of N times in succession the two steps of:

(1) performing an $SiO_2$ etch simultaneously on all of said plurality N of $SiO_2$ patterns to expose one or more respective regions of said surface of said silicon wafer beneath a thinnest remaining one of said plurality N of $SiO_2$ patterns; and (2) performing a silicon etch simultaneously on said silicon wafer below all of said exposed respective regions of said surface of said silicon wafer, wherein said exposed respective regions are etched down by a depth comprising a difference between said respective depth, associated with said thinnest remaining one of said plurality N of $SiO_2$ patterns, and said respective depth associated with a next thinnest remaining one of said plurality N of $SiO_2$ patterns;

wherein:

each of said plurality N of patterns are etched down into said silicon wafer to their respective depth of etching, and a multi depth structure in said silicon wafer is formed.

2. The method of manufacturing said silicon waveguide circuit element of claim 1, wherein the step of providing said $SiO_2$ layer on said surface is performed by plasma-enhanced chemical vapor deposition.

3. The method of manufacturing said silicon waveguide circuit element of claim 1, wherein the step of providing said $SiO_2$ layer on said surface is performed by thermal growth of $SiO_2$.

4. The method of manufacturing said silicon waveguide circuit element of claim 1, wherein said initial thickness of said $SiO_2$ layer is sufficient to provide a safety margin after said plurality N of patterns are etched in said $SiO_2$ layer.

5. The method of manufacturing said silicon waveguide circuit element of claim 1, wherein said step of performing an $SiO_2$ etch is done using an inductively coupled plasma.

6. The method of manufacturing said silicon waveguide circuit element of claim 1, wherein said step of performing said silicon etch is done using deep reactive ion etching.

7. The method of manufacturing said silicon waveguide circuit element of claim 6, wherein said deep reactive ion etching is performed using $SF_6$.

8. The method of manufacturing said silicon waveguide circuit element of claim 7, wherein said deep reactive ion etching is followed by a step comprising exposing said silicon wafer to $C_4F_8$ gas.

9. The method of manufacturing said silicon waveguide circuit element of claim 1, wherein said respective depths etched into said silicon wafer are controlled to within 2% of depth targets for said respective depths.

10. The method of claim 1, wherein said silicon waveguide circuit element is a terahertz silicon waveguide circuit element comprising said multi depth structure.

11. The method of claim 10, wherein said multi depth structure includes a cross section of a waveguide that is rectangular.

12. The method of claim 1, wherein:

for the first repeating of said two steps, said thinnest remaining one of said plurality N of $SiO_2$ patterns has said respective thickness representing a deepest of said respective depths of etching into said silicon wafer, and for the final repeating of said two steps, said thinnest remaining one of said plurality N of $SiO_2$ patterns has said respective thickness representing a shallowest of said respective depths of etching into said silicon wafer.

13. A method of fabricating a silicon waveguide component, comprising:

providing at least one mask on silicon, the at least one mask including a plurality N of patterns, the patterns each:

associated with a different thickness of the mask designed to achieve a different depth of etching into the silicon, where N is an integer; and indexed with an integer j, wherein 1≤j≤N and the $j^{th}$ pattern is designed to achieve a deeper depth of etching than the $j+1^{th}$ pattern;

performing N etch steps each indexed with an integer k, wherein:

1≤k≤N and the etch steps are performed in order of increasing k, and during the $k^{th}$ etch step, the silicon is etched with all the one or more $j^{th}$ patterns, wherein j≤k, by a depth comprising a difference between the depth associated with the $j^{th}$ pattern wherein j=k and the depth associated with the $j^{th}$ pattern wherein j=k+1; and wherein each pattern is etched down into the silicon such that the $j^{th}$ pattern is etched down to the depth associated with the $j^{th}$ pattern and the waveguide component comprising a multi depth structure in the silicon is formed.

14. The method of claim 13, wherein the silicon is etched using deep reactive ion etching.

15. The method of claim 13, wherein the silicon waveguide component is a silicon terahertz waveguide.

16. The method of claim 15, wherein the silicon terahertz waveguide has an insertion loss that is decreased as compared to insertion loss for a silicon terahertz waveguide fabricated using a process wherein structures in the silicon terahertz waveguide are etched to their final depth in the silicon in a single etch step.

17. The method of claim 15, wherein the silicon terahertz waveguide hosts a mixer.

18. A method of fabricating a silicon waveguide component, comprising:

providing a mask including a plurality of patterns;

gradually etching the plurality of the patterns into silicon using a plurality of etch steps, wherein:

the patterns are each etched to an etch depth in the silicon;

the patterns are etched in a succession starting with the pattern being etched to a deepest etch depth and ending with the pattern being etched to a shallowest etch depth and such that each of the patterns are etched down with a next one of the patterns, and each etch step etches a depth difference between the patterns until all the patterns are etched to their etch depth.

* * * * *